United States Patent [19]

Currie

[11] 3,952,888
[45] Apr. 27, 1976

[54] DISCHARGE CONVEYOR FOR TRANSFERRING PALLETIZED CARTONS ONTO A TRUCK, CART AND THE LIKE

[75] Inventor: Richard W. Currie, Saratoga, Calif.

[73] Assignee: Currie Machinery Company, Santa Clara, Calif.

[22] Filed: Aug. 2, 1974

[21] Appl. No.: 494,090

[52] U.S. Cl. .............................. 214/41 R; 198/160; 198/171; 214/89
[51] Int. Cl.² ........................................ B65G 67/04
[58] Field of Search ............... 214/6 F, 6 P, 41, 42, 214/89; 198/171

[56] References Cited
UNITED STATES PATENTS
3,595,415   7/1971   Herd .................................. 214/42 X
3,669,282   6/1972   Carlson ............................. 214/6 P Primary Examiner—Robert G. Sheridan

[57] ABSTRACT

A cart loading conveyor for receiving palletized cartons at one level from a pallet loader and for lowering the same to the flat bed surface of a cart, truck and the like for deposit thereon in a manner avoiding tilting of the interlocked stack of cartons on the pallet during skidding of the pallet onto the flat bed of such truck. A discharge conveyor having a tunnel-like cart receiving zone beneath a pallet support plate arranged for up and down movement between a level for receiving units of palletized cartons at higher level and for lowering the latter vertically to the level of the top surface of the flat bed of such cart whereby a unit of palletized cartons discharging from the support plate is transferred to such cart in a non-tilted condition similtaneously with the moving of the cart out of such tunnel-like zone.

6 Claims, 10 Drawing Figures

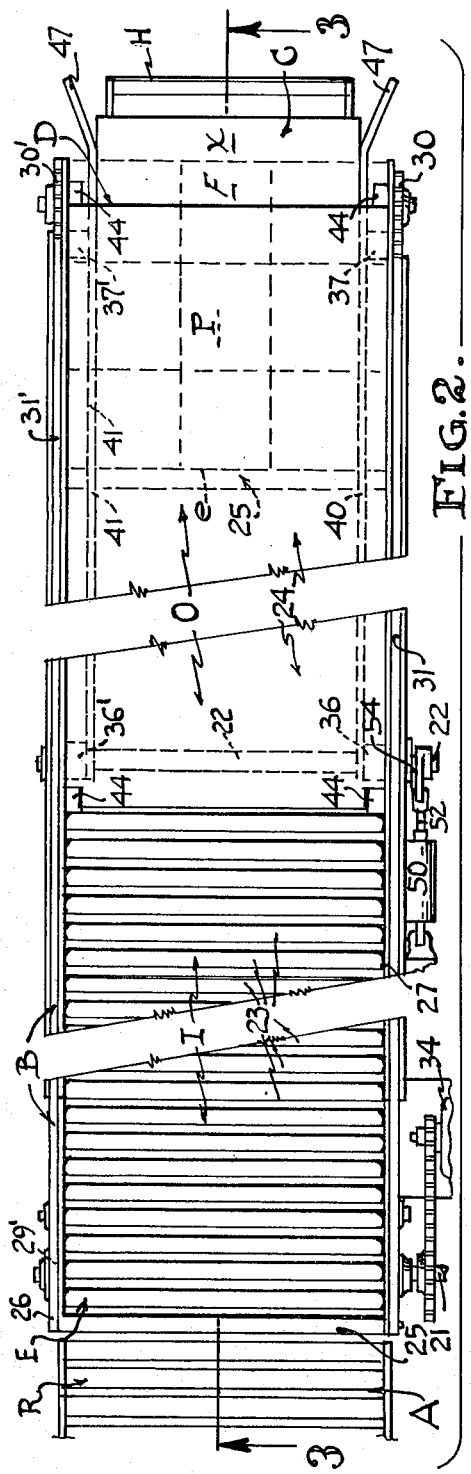
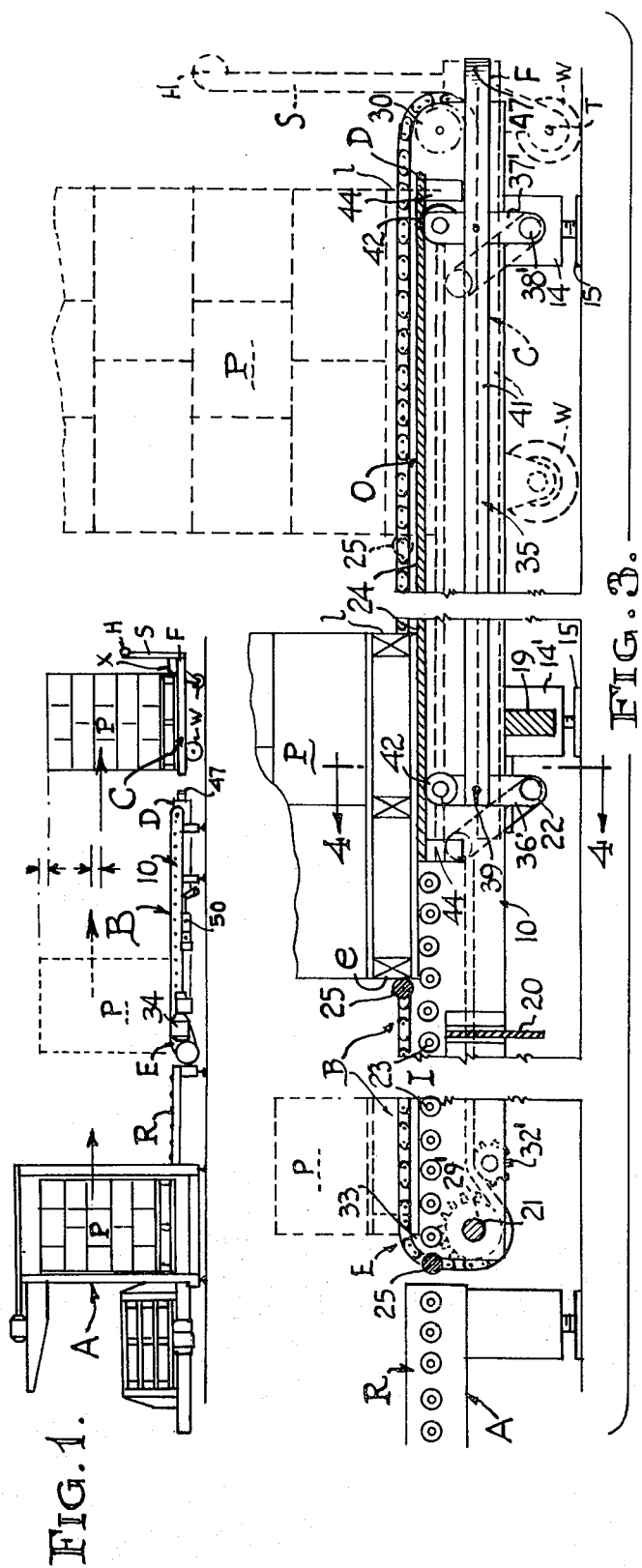

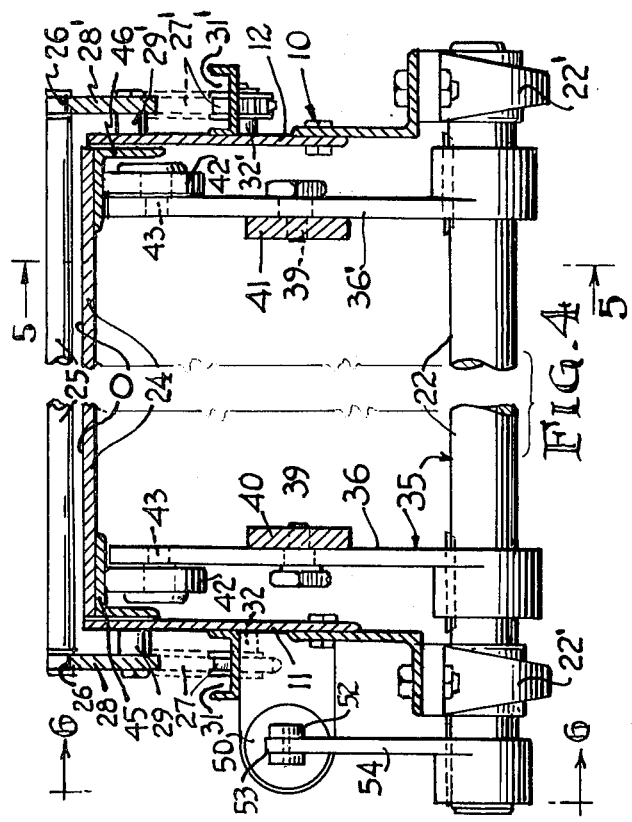
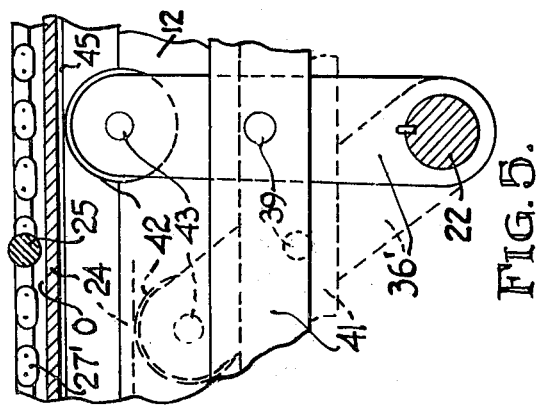
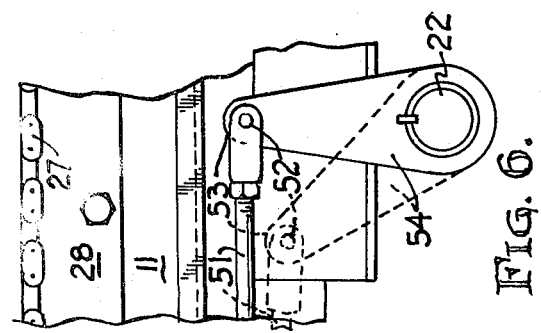
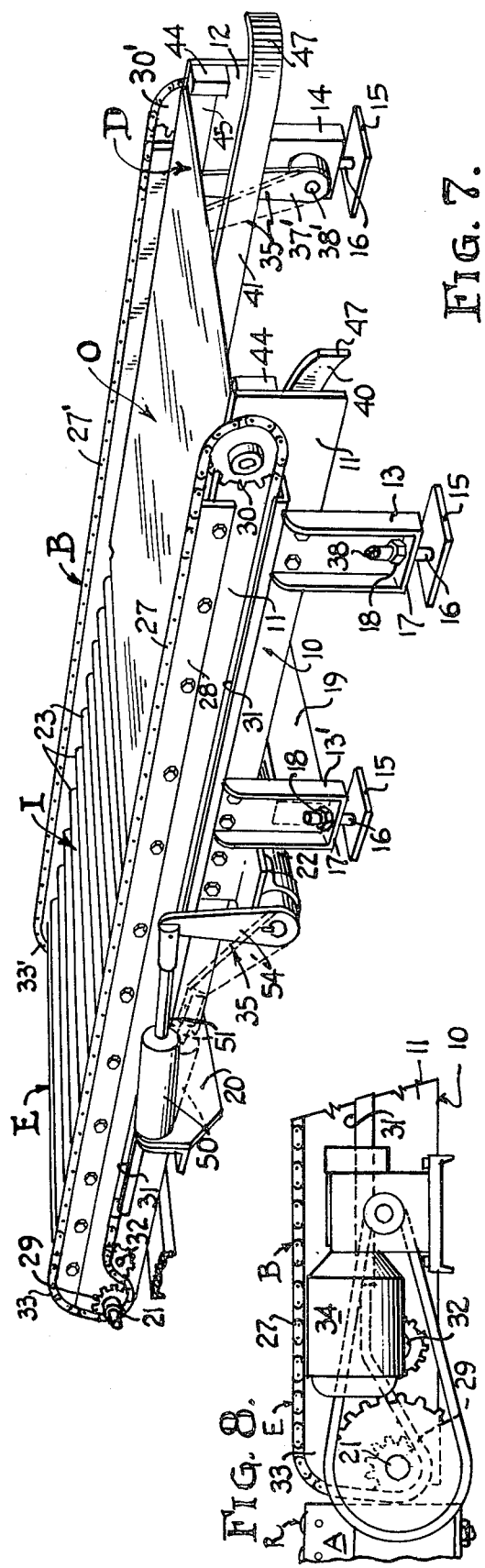

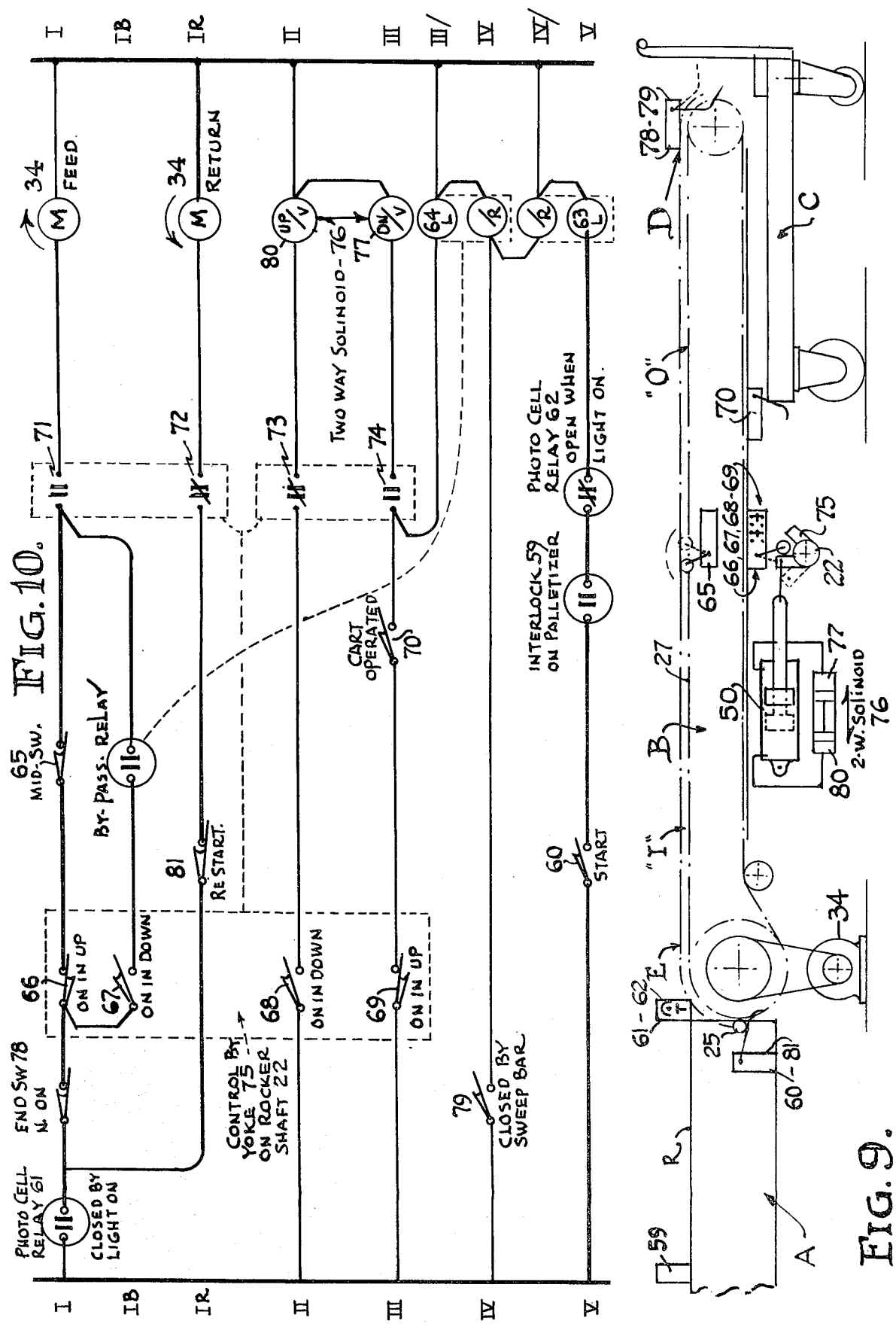

3,952,888

DISCHARGE CONVEYOR FOR TRANSFERRING PALLETIZED CARTONS ONTO A TRUCK, CART AND THE LIKE

BACKGROUND

This invention relates to conveyors and more particularly to a Discharge Conveyor for receiving palletized cartons from a carton palletizer and for automatically placing such palletized cartons onto a wheeled vehicle or truck for movement thereby away from the carton palletizer.

Pallet loaders are devised for automatically stacking cartons in interlocking relation upon a pallet for movement as a unit to a place of storage, rehandling and shipping by other means of transportation. Such palletizers are well known in the art as exemplified by U.S. Pat. No. 2,769,179 or U.S. Pat. No. 2,883,074, as well as my co pending application Ser. No. 418,945 filed Nov. 26, 1973, now U.S. Pat. No. 3,856,158.

Heretofore, the pallets with cartons thereon had to be taken from the palletizer by a fork-lift and placed thereby onto flat bed dollies, trucks and the like for movement to a place of use or storage. In some establishments, the palletized cartons are preferably placed on individual flat bed hand trucks for movement in tandem fashion like a train of cars pulled by a draft vehicle. The time consumed in transferring each loaded pallet from the palletizer onto such hand trucks by means of a fork-lift can be very expensive and time consuming. It is such a problem that the present invention seeks to alleviate by the provision of a Discharge Conveyor assembly between a palletizer and individual flat-bed hand trucks which are suitably placed to receive palletized cartons directly and automatically from the palletizer without the need of fork-lift equipment.

STATEMENT OF THE INVENTION

It is an object of the present invention to provide a discharge conveyor for receiving a pallet loaded with cartons directly from a palletizer.

It is another object to provide such discharge conveyor with a pallet plate onto which palletized cartons can be moved to an area overlying a tunnel within which the flat bed of a hand truck may be placed.

It is another object to support the pallet plate at an elevation common to the discharge end of a palletizer and slightly above the surface of the flat bed of the hand truck.

It is still another object to provide means within the tunnel below the pallet plate for aligning the truck bed with the palletized cartons supported on the pallet plate.

It is yet another object to provide means for raising and/or lowering the pallet plate to the level of the top surface of the flat bed of the hand truck therebeneath; and means for moving the pallet loaded with cartons along the pallet plate and against a stop block on the hand truck whereby the hand truck is moved out of the tunnel beneath the pallet plate simultaneously with movement of the palletized cartons from the pallet plate onto the flat bed of the hand truck.

This invention further contemplates the provision of means for automatically controlling the movement of palletized cartons along the discharge conveyor as well as lowering the pallet plate as aforesaid in timed relation to arrival of pallets on the pallet plate and for elevating the latter to reset it for receipt of the next palletized carton and hand truck to be loaded.

These and other objects of the present invention will become apparent from a reading of the following specification and claims in the light of the accompanying three sheets of drawing in which:

FIG. 1 is a side elevational view of the Discharge Conveyor assembly unit of the present invention arranged between a pallet loader and a cart;

FIG. 2 is a plan view of the Discharge Conveyor assembly of FIG. 1 foreshortened but at larger scale, and with a cart disposed beneath the discharge end of the conveyor for receiving a pallet loaded with cartons therefrom;

FIG. 3 is a longitudinal section through FIG. 2 taken along line 3—3 therein;

FIG. 4 is a cross section through FIG. 3 taken along line 4—4 therein at larger scale with respect thereto;

FIG. 5 is a section through FIG. 4 as seen from line 5—5 therein;

FIG. 6 is side elevation of a portion of FIG. 4 as seen from line 6—6 thereof;

FIG. 7 is a perspective view of the Discharge Conveyor assembly;

FIG. 8 is a fragmentary elevation of the drive mechanism of the Discharge Conveyor;

FIG. 9 is a schematic diagram of the components of the apparatus locating switches and controls thereon; and FIG. 10 is a wiring diagram of the control circuit.

GENERAL DESCRIPTION

Referring to FIG. 1 in the drawings, a pallet loader designated A is disposed to discharge palletized cartons P in the direction of arrow $a$ onto a discharge conveyor B for further movement in the same direction and ultimate deposit onto the flat bed of a hand cart C. Neither the pallet loader A nor the cart C form a part of the present invention other than the environment between which the discharge conveyor B of the present invention affects an automatic transfer of palletized cartons from the loader A to the cart C.

In the present disclosure, the pallet loader A is shown to have an off ramp consisting of a short length roller conveyor R extending therefrom for receiving and supporting a unit of palletized containers P discharged from the pallet loader A. In the absence of such short length of roller conveyor R the discharge conveyor B of the present invention may have its receiving end E disposed to receive each unit of palletized cartons P directly from the pallet loader A. In either event, the discharge conveyor B has one end thereof disposed to receive palletized cartons for movement toward its opposite end D for discharge onto the cart C which in the present disclosure, is shown to be a flat-bed hand truck.

These flat-bed hand trucks C are used extensively in warehouses and plants because of their stability and safe support for a stack of cartons arranged in interlocked relation on a four by four pallet of conventional design. Briefly, these carts C consist of a sturdy flat bed F having four wheels W, two of larger diameter at one end and two caster type wheels T at the opposite end adjacent a handle H on upstanding standards S on the cart C. The individual carts C can be easily moved by hand or may be coupled one to another in tandum fashion for connection train-like to a draft vehicle for safe transmittal to other locations. Having thus described the environmental aspects in which the Discharge Conveyor of the present invention is most suited for use, a description of the latter follows.

DETAILED DESCRIPTION

Referring now to FIGS. 7, 2, 3 and 4, the discharge conveyor B comprises of frame 10 consisting of parallel side plates 11 and 12 supported on four legs 13, 13' and 14, 14' on opposite side plates 11 and 12, respectively. These legs 13, 13' and 14, 14' each have leveling pads 15 from which threaded rods 16 extend upwardly through base flanges 17 of each leg for adjustment by suitable threaded nuts 18. The side plates 11 and 12 are joined in spaced parallel relation by a cross bar 19 having its ends welded to the innermost pair of legs 13' and 14'. A cross web 20 also ties the side plates 11 and 12 in spaced relation along with a drive shaft 21 as well as a rocker shaft 22 which is journaled in suitable bearings 22' on the side plates 11 and 12.

The upper surface of the discharge conveyor B is divided into two zones I and O (in and out). The in zone I begins at the end E of the frame 10 and has a series of rollers 23 extending transversely between side walls 11 and 12 in the form of an ordinary free roller conveyor. The out zone O of the Conveyor B has a pallet support plate 24 which extends from the zone I to the discharge end D of the Conveyor B.

The pallet support plate 24 is normally supported with its top surface disposed in a horizontal plane tangent to the upper surface of the rollers 23 of the in zone I. By this arrangement, each unit of palletized cartons P rolling down the off ramp R of the pallet loader A arrives fully on the rollers 23 of the in zone I of the discharge conveyor B.

Each unit of palletized cartons P is moved along the Discharge Conveyor B by a sweep bar 25 extending transversely of the conveyor B and movable from end to end thereof. The sweep bar 25 has its ends mounted on suitable bearings formed as part of a sweep bar chain connector 26 at each side 11 and 12 of the frame 10. The chain connectors 26 are each secured to one link of a pair of chains 27 and 27' disposed to ride upon chain guide rails 28 and 28', respectively. The chain guide rails 28 and 28' are mounted in offset relation to and exteriorly of each of the side plates 11 and 12 as best illustrated in FIG. 4. The chains 27 and 27' which are closed-loop or endless are trained around drive sprockets 29–29' keyed to the drive shaft 21 and idler sprockets 30–30'. The drive shaft 21 is disposed at the entrance end E of the frame 10 and the idler sprockets 30–30' are at the opposite discharge end D of the frame 10. These sprockets are in alignment with the respective chain-guide rails 28 and 28' on each side of the frame 10. The upper reach of each chain 27 and 27' is thus maintained in a horizontal plane with its rollers riding the upper edge of the respective guide rail 28 and 28' as the case may be. The lower reach of each chain which would normally hang in a catenary curve is prevented from doing so by a shallow channel 31–31' supported on the side walls 11 and 12 at each side of the frame 10. The lower reach of each chain 27 and 27' is thus supported parallel to its upper reach and in a plane slightly above the axis of the drive shaft 21 (FIGS. 3, 7 and 8).

The channel 31 and 31' end a short space distance from the drive sprockets 29–29' and the chains 27–27' are trained over idler sprockets 32–32' mounted in the side walls 11 and 12 in such space to facilitate a good circumferential grip of the chains with the teeth of the drive sprockets 29–29'. As best seen in FIGS. 2 and 8, it will be noted that the chains 27–27' partially circumscribe the drive sprockets 29 and 29' in substantially tangent relation to a curved lead corner 33–33' vertically above the drive sprockets. Moreover, the sweep bar 25 carried by the chains 27–27' is disposed to pass between the last roller on the off ramp R of loader A and the first roller 23 on the in zone I of the discharge conveyor B.

The chains 27 and 27' are driven by an electric motor 34 through suitable drive connections with the drive shaft 21 as illustrated in FIG. 8. In view of the manner in which the chains 27–27' are supported at their lower reaches, the motor 34 is preferably a reversable motor in a control circuit later to be explained. For the present, it will be seen that the sweep bar 25 engages the backmost edge e of a pallet P (FIG. 3) supported on the in zone I rollers 23 for movement thereover toward the discharge end D of the Conveyor B. Each palletized carton P is thus transferred to the out zone O for support upon the pallet support plate 24 therein.

As previously pointed out, the pallet support plate 24 is normally suppported with its top surface disposed in a horizontal plane substantially tangent to the upper surface of the rollers 23 in Zone I. Therefore, there will be no tipping of the column of cartons stacked upon a pallet as it is transferred to the pallet support plate 24. After each unit of palletized cartons P is safely lodged on the pallet support panel or plate 24, the latter is lowered slightly to a level substantially at the top surface of the flat bed F of a cart C about to receive the unit of palletized cartons P. This alleviates any drop-off or tilting of the cartons stacked upon a pallet. Moreover, it provides a tunnel like space below the pallet support plate 24 wherein the flat bed F of a cart C can be disposed for the receipt of a unit of palletized containers in accordance with the present invention.

Means for lowering and/or raising the pallet support plate 24 between its limits comprises a parallelogram lift mechanism 35. The lift mechanism 35 included the aforementioned rocker shaft 22 and four rocker arms 36–36' and 37–37'. Two of these rocker arms, 36–36', are keyed to the rocker shaft 22 (FIG. 4) and the other two, 37–37' are each independently supported on stud shafts 38 and 38', respectively, mounted in axial alignment on the inner faces of the outermost pair of legs 13 and 14 at the discharge end D of the frame 10 (FIGS. 3 and 7). The four rocker arms 37–37' and 38–38' are maintained in parallel relation by being pivotally connected as at 39 to wagon guide bars 40 and 41, respectively. The pivotal connections 39 are at a comparable radial distance from the rocker shaft 22 and the stud shafts 38–38' to support the wagon guide bars 40 and 41 in parallel horizontal relation adjacent opposite sides 11 and 12 of the frame 10. The wagon guide bars 40 and 41 are thus arranged in spaced horizontal relation to receive and guide the flat bed F of a cart C within the tunnel-like space below the pallet support plate 24.

The upper end of each of the four rocker arms 37–37' and 38–38' has a roller wheel 42 mounted thereon by means of a roller bearing pin 43. The axes of the roller bearing pins 43 are each disposed an identical radial distance from the axis of rockability of the rocker arms 37–37' and 38–38'. By this arrangement, the four roller wheels 42 are set to engage the lower surface of the pallet support plate 24 for moving the latter up and down dependent upon the disposition of the four rocker arms 37–37' and 38–38'. It should here be noted that the pallet support plate 24 is guided up and down movement vertically by means of pallet plate guides 44 at four corners of the support plate 24. The pallet plate guides 44 are welded to the inner surface of the side walls 11 and 12 to assure against displacement of the pallet support plate 24 lengthwise of the frame 10 by reason of skidding movement of a pallet loaded with cartons along the upper surface of plate 24 by the sweep bar 25.

As best seen in FIG. 4, the pallet support plate 24 is reinforced lengthwise by angle iron rails 45–46 at its side edges. These angle iron rails 45–46 have their horizontal flanges welded to the underside of the support plate 24 to serve as a bearing surface between the latter and the respective roller wheels 42. Moreover, the vertically disposed flanges of the angle iron rails 45–46 are disposed in proximity to the respective side walls 11 and 12 for guidance thereby laterally during up and down movement of the pallet support plate 24 therebetween.

As best seen in FIGS. 2 and 7, wagon guide bars 40 and 41 extend outwardly of the frame 10 beyond the discharge end D of the frame 10. The extreme ends 47 of the guide bars 40 and 41 are flared divergingly and laterally crosswise of the frame 10 for guiding the flat bed F of a cart C into axial alignment longitudinally of the frame 10 and beneath the pallet support plate 24.

The cart C is rolled back into the tunnel-like space beneath the pallet support plate 24 while the latter is held in raised position by the parallelogram mechanism 25. Once a pallet P loaded with cartons becomes fully supported on the pallet support plate 24, the latter is lowered to its other limit of movement by action of the rocker shaft 22 under the influence of an air cylinder 50. The air cylinder 50 is of the double acting type controlled by a solenoid operated valve in turn operated by a dual acting switchengageable by the sweep bar 25.

The switches mounted on one side wall 11 of the frame 10 in a region where the sweep bar 25 has passed the inner end zone I and arrived above the pallet support plate 24 in zone O. In other words, as soon as a unit of palletized cartons P is fully supported on the plate 24, the air cylinder 50 is operated to withdraw its piston rod 51. The piston rod 51 has its free end pivotally connected as at 52 to the extreme end 53 of a lever 54 having its opposite end keyed to the rocker shaft 22 (FIGS. 6 and 7). By this action, the lever 54 is moved an angular distance sufficient to rock the rocker shaft 22 and the parallelogram mechanism 35 accordingly. This moves the four rocker arms 37–37' and 38–38' in unison from full to dotted line positions as illustrated in FIGS. 3, 5 and 7. The roller wheels 42 and the several rocker arms 37–37' and 38–38' are thus lowered in unison. The pallet support plate 24 with a unit of palletized cartons P thereon is thus lowered vertically to the level of the top surface of the truck bed F of the cart C disposed in the tunnel space beneath the plate.

The base of the pallet P on the support plate 24 is now at a level such as to skid off the plate 24 and directly onto the cart C. The leading edge l of the pallet P thus engages a cross block X on the top surface of the flat bed F of the truck C such that the cart is moved simultaneously with and by the oncoming unit of palletized cartons P. The cart C is therefore moved out of the tunnel simultaneously with the discharge of the pallet from the plate 24 under the influence of the sweep bar 25. Therefore, no skidding motion occurs between the base of the pallet and the upper surface of the flat bed F of the cart C as the unit of palletized cartons P moves off of the discharge end D of the support plate 24 and onto the cart.

Refer now to FIG. 9 depicting the mechanical aspects schematically with control mechanisms and to FIG. 10 showing a wiring diagram of the control circuit coardinated with the control mechanism of FIG. 9. In FIG. 10 the wiring diagram has been illustrated with separate lines I, IB, IR, II, III, IV and V for purposes of clarity. The entire control circuit is interlocked with the palletizer A by a relay 59 in line V. In this manner the discharge conveyor B can only operate when the palletizer is in operation and the sweep bar 25 is at start position to close the start switch 60.

In addition to the interlock relay 59 the control circuit also includes a photo electric cell 61 disposed to be impinged by a light beam across the entrance end E of the discharge conveyor in a conventional manner.

For purpose of explaining the operation, it will be assumed that the sweep bar 25 is at a start position at the entrance E of the discharge conveyor B and that the support plate 24 is in "up" position by operation of the lift mechanism 34, the rocker shaft 22 under the influence of the air cylinder 50.

Now when a unit of palletized containers P comes from the palletizer onto the entrance end E of the discharge conveyor it obstructs the light beam to the photo cell 61 and cuts off current through line I, and opens circuit in line V through photo cell 62 to lock relays 63 and 64 in circuit. However, current cannot flow through the feed winding of motor 34 until the unit of palletized containers P has fully passed the light beam and arrived on the rollers 23 at the entrance end E of the discharge conveyor, thereafter current flows to the feed winding of motor 34 through all of the switches in line I which are in current conducting condition.

The motor 34 is rotated clockwise FIG. 10 to move chains 27–27' and sweep bar 25 toward the discharge end D of the conveyor B. The unit of palletized cartons P is thus moved onto the support plate 24 and when fully thereon, will engage the feeler arm of a mid switch 65 in line I. This breaks circuit to the feed winding of motor 34 to stop the chains 27–27' and sweep bar 25. The unit of palletized carton P is now at rest upon the fully elevated pallet support plate 24.

It should here be noted that the feed winding of the motor 34 is also controlled by a pair of limit switches 66 and 67 in lines I and IB associated with the elevator-lift mechanism 35. The limit switch 66 in line I is normally closed when the pallet support plate 24 is in uppermost position while the limit switch 67 in line IB is normally open until the elevator-lift mechanism 35 has lowered the pallet support plate to fully down position. A third switch 68 (in line II) associated with the limit switch 66 is normally open, but closed only when the elevator-lift mechanism 35 has been lowered towards its bottom limit. A fourth switch 69 (in line III) is associated with switch 68 and is normally closed when the elevator is up position and open when the elevator-lift mechanism is completely down.

By this arrangement current may flow through line III provided there is a cart C disposed below the plate 24. The presence of a cart C in proper position to receive a unit of palletized cartons P is detected by a safety switch 70 (in line III) having a feeler arm (FIG. 9) adopted to be engaged by a cart.

A bank of relays 71, 72, 73 and 74 are under the control of the rocker shaft 22 by means of a yoke 75 (FIG. 9) thereon changing the positions of four sets of switches 66, 67, 68 and 69 dependent upon the up or down position of the elevator mechanism 35. The relays 71 and 74 (lines I and III respectively) are normally locked in closed condition by the locking relays 63 and 64. The relays 72 and 73 (lines IR and II respectively) are normally open until reversed by the release of locking relays 63 and 64.

With the relays 71, and 74 locked in closed circuit condition and a cart C disposed to close safety switch to current flowing through line III operates a two way solenoid 76 to open valve 77 to cause the piston in cylinder 50 (FIG. 9) to be drawn to the left. This rocks the rocker shaft 22 and yoke 75 counter clockwise lowering the support plate 24.

The support plate 24 with a unit of palletized cartons P thereon is then lowered to rest upon the top surface of the flat bed of the cart C which the elevator-lift mechanism 35 may continue to move beyond such condition until the flow of fluid in the cylinder 50 again becomes equalized and at rest.

At this stage the switches 66 and 69 open and the switches 67 and 68 close under the control of the yoke 75 and rocker arm 22. Thus current can now flow through switch 67 (line IB) to by-pass the mid switch 65 in line I and cause the motor 34 to continue to operate through its feed winding. The sweep bar 25 thereby continues to move toward the discharge end of the conveyor B. The unit of palletized cartons P is thus skidded along the support plate 24 and ultimately out the flat bed of the cart C which is simultaneously rolled out from under the support plate by the pallet engaging the block X on the cart.

When the pallet is finally fully off of the support plate 24 and sweep bar 25 engages the feeler arm of a limit switch 78 (line I) on the discharge end of the conveyor B. This stops the motor 34 from further operation through its feed winding. A normally open secondary switch 79 (line IV) associated with the switch 78 becomes momentarily closed to release the holding relays 63 and 64. This changes the bank of relays 71, 72, 73 and 74 to open relays 71 and 74 and to close relays 72 and 73. Relay 73 and switch 68 in line II now being closed, current flows into the two way solenoid 76 via valve 80 to urge the piston in cylinder 50 to the right (FIG. 9). This rocks rocker shaft 22 clockwise to operate the elevator lift mechanism 35 to raise the support plate 24. A secondary switch 81 associated with the start switch. 60 is closed when the sweep bar 25 is away from starting position. Secondary switch 81, in line IR of the circuit thus permits current to flow through the now closed relay 72 in the cam controlled bank of relays. Thus current flows through the return winding of the reversable motor 34 to reverse the chains 27-27' and move the sweep bar 25 back to start position. By that time the elevator-lift mechanism 34 will have completed its rise to reset the yoke 75 and four sets of switches 66, 67, 68 and 69 to start condition. This resets the relay switches, 71, 72, 73 and 74 to normal starting condition as shown in the diagram (FIG. 10). The apparatus is now ready to repeat the operation as aforesaid.

I claim:

1. A discharge conveyor for receiving palletized cartons at a predetermined level at one end for discharge at its opposite end and at a lower level onto the top surface of the truck bed of a cart and the like without tilting of such palletized cartons, comprising in combination:
   a. a frame;
   b. a roller conveyor at the receiving end of said frame for receiving and supporting a unit of palletized cartons at said predetermined level;
   c. pallet moving means supported on the side walls of said frame for engaging each unit of palletized cartons arriving on said roller conveyor for moving said pallet of cartons toward the opposite end of said conveyor;
   d. a skid plate at the opposite end of said conveyor;
   e. an elevator-lift mechanism on the side walls of said frame and below said skid plate for normally supporting the latter at said predetermined level for receiving a unit of palletized cartons therefrom;
   f. a tunnel-like space below said skid plate for receiving the truck bed of a cart disposed therebelow;
   g. a cart having a flat truck bed for supporting said skid plate thereon and means on the top surface of the truck bed of such cart engageable by the pallet of a unit of palletized cartons discharging from said conveyor for simultaneously moving the cart from below said skid plate in unison with the movement of said unit of palletized cartons off of said skid plate and onto the truck bed of the cart; and
   h. control means operatively associated with said elevator-lift mechanism and including:
      1. an electric motor for driving said pallet moving means;
      2. an electrical switch disposed at the mid zone of said roller conveyor adapted to be engaged by the pallet of a unit of palletized containers fully arrived on said skid plate for cutting off electrical current to said electric motor during lowering of said skid plate by said elevator-lift mechanism; and
      3. a limit switch engageable by said elevator-lift mechanism as it arrives at its lowered condition for re-establishing electrical current to said electrical motor for driving said pallet moving means to move the pallet on said skid plate further toward the discharge end of said conveyor and onto the flat bed of said cart.

2. The discharge conveyor in accordance with that of claim 1 including means operatively connected to said control means and disposed in said tunnel-like space below said skid plate for engagement by a cart fully disposed therein for detecting the presence of a cart therein prior to reestablishing electrical current to said electric motor after lowering of said skid plate.

3. The discharge conveyor in accordance with that of claim 1 in which said elevator-lift mechanism comprises:
   a. a rocker shaft supported on the side walls of said frame transversly of and below said skid plate;
   b. a pair of lever arms keyed to said rocker shaft for limited movement thereby;
   c. means on each of lever arms engaging the lower surface of said skid plate for limited movement therewith between said predetermined level and said lower level; and d. means on the side walls of said frame for guiding said skid plate for up and down movement vertically between said limits of movement.

4. The discharge conveyor in accordance with claim 3 in which said elevator-lift mechanism comprises a parallelogram in which:
   a. said rocker shaft is supported transversely of said frame inwardly of the discharge end of said conveyor;
   b. a second pair of lever arms each having means on one end engaging said skid plate and its opposite end independently mounted for rocking movement on a respective side wall of said frame on axes parallel to said rocker arm and indentically adjacent the discharge end of said conveyor; and
   c. spaced guide rails each parallel to said side walls and each pivotally connected to the lever arms adjacent thereto equidistant from the axes of rocking movement thereof for rocking said second pair of lever arms is unison with the pair of rocker arms on said rocket shaft for raising and lowering said skid plate.

5. The discharge conveyor in accordance with claim 4 in which said tunnel-like space below said skid plate and the spaced guide rails of said lift mechanism therein are spaced for guiding the truck bed of a cart within said space incident to the lowering of said plate relative to the top surface of said truck bed.

6. The discharge conveyor in accordance with that of claim 5 including means operatively connected to said control means and disposed in said tunnel-like space below said skid plate for engagement by a cart fully disposed therein for detecting the presence of a cart therein prior to reestablishing electrical current to said electric motor after lowering of said skid plate.

* * * * *